United States Patent [19]

Kenney, II

[11] 4,383,279

[45] May 10, 1983

[54] REPRODUCTION OF SPECIAL PURPOSE INFORMATION ON A VIDEO DISC

[75] Inventor: George C. Kenney, II, Stamford, Conn.

[73] Assignee: North American Philips Corporation, New York, N.Y.

[21] Appl. No.: 211,553

[22] Filed: Dec. 1, 1980

[51] Int. Cl.³ .............................................. H04N 5/76
[52] U.S. Cl. .................................. 358/341; 358/342; 360/10.1; 360/33.1; 360/19.1; 369/93; 369/111
[58] Field of Search .................. 358/128.5, 128.6, 127, 358/341, 342, 335, 312; 360/33, 10, 19, 22, 77, 360/10.1, 33.1, 19.1, 9.1; 369/93, 95, 102, 369/111, 60, 43, 44

[56] References Cited

U.S. PATENT DOCUMENTS

| | | | |
|---|---|---|---|
| 3,789,137 | 1/1974 | Newell | 360/8 |
| 3,812,533 | 5/1974 | Kimura | 360/77 |
| 4,213,148 | 7/1980 | Clemens | 358/128.6 |
| 4,227,213 | 10/1980 | Isobe | 358/128.5 |
| 4,317,131 | 2/1982 | Jerome | 369/95 |

Primary Examiner—Alan Faber
Attorney, Agent, or Firm—Thomas A. Briody; William J. Streeter; Laurence A. Wright

[57] ABSTRACT

A device which provides a video playback apparatus that plays a video disc having different video information and special purpose information tracks. A multi-line video information storage circuit, a special purpose information storage circuit and a radial tracking mirror are controlled by a timing circuit in such a manner that the special purpose information track is sampled for a predetermined period and stored video information is displayed such that continuous video information and special purpose information recorded on the video disc is presented contemporaneously to a monitoring means.

5 Claims, 4 Drawing Figures

SYSTEM BLOCK DIAGRAM

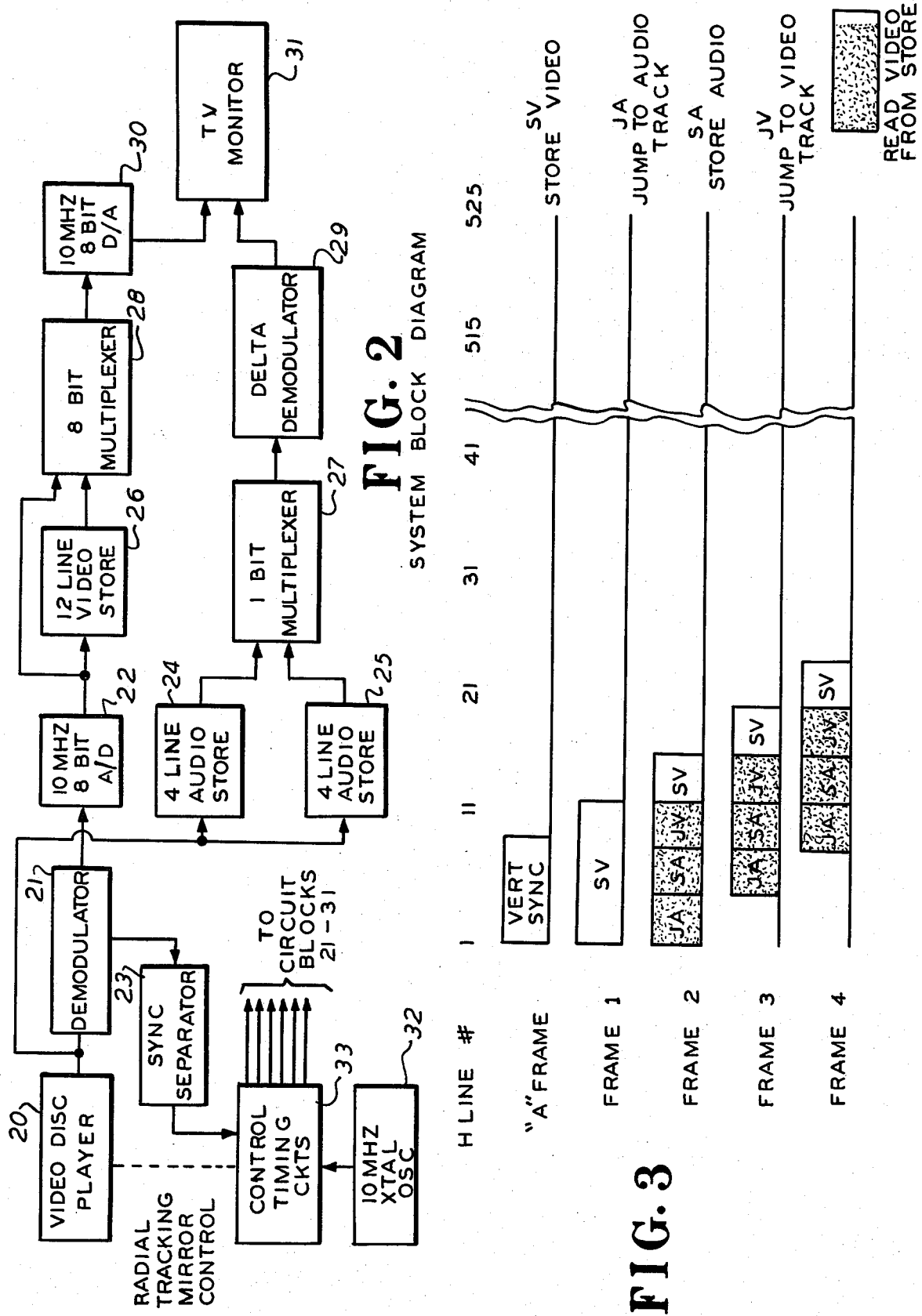

REPRODUCTION OF SPECIAL PURPOSE INFORMATION ON A VIDEO DISC

The present invention relates to a novel approach to increase the audio or data information available per still frame on a videodisc.

BACKGROUND OF THE INVENTION

The audio and video information recorded on a videodisc is accomplished by focusing a laser beam on the spinning disc causing holes or pits to be formed in the spiral tracks in the medium of the disc. The holes or pits formed in the tracks of the disc contain coded video, audio and other data signals which result from modulating the laser beam during recording. The videodisc is similar in appearance to the conventional audiodisc. However, the videodisc is designed to play color pictures and sound through a standard color television set. Alternately, the videodisc may be designed to play black and white pictures with sound on a black and white television set.

When the videodisc is played on a videodisc player it is spun at a high rate of speed and a laser light is employed to read the recorded data on the disc by reflecting light from the disc where holes or pits have been formed in the tracks during recording. The reflected light (which is brightness or intensity modulated) passing through a set of optics is then applied to a detector array where the signals are detected and processed for application to a T.V. monitor.

It is known in the prior art to provide a videodisc having separate data information tracks. U.S. Pat. No. 4,213,148 to Clemens teaches a videodisc player in which the video disc comprises three separate data information tracks. The first and third tracks provide pilot signals to the pick-up in order to maintain the pick-up in alignment with the information track. By comparing the two pilot track signals in a comparator circuit, the pick-up is moved to align with the information track.

U.S. Pat. No. 4,227,213 teaches a system for recording stationary images on a videodisc in which a stationary image video signal of at least one frame is optically recorded on the track every revolution of the disc. In this patent as in other prior art devices the audio and video are recorded in the same track of the disc.

Notwithstanding the teaching of the prior art, no known system has been capable of providing a special purpose information track and a video information track which is capable of sampling between the two in order to provide continuous special purpose information and video information. This is because heretofore the videodisc player could not read both tracks simultaneously. Therefore, some technique is needed to provide continuous display of the video information and simultaneously to provide special purpose information.

BRIEF DESCRIPTION OF THE INVENTION

The teaching of the present invention is suitable for special purpose application of videodiscs such as talking encyclopedia, interactive educational terminals, graphical displays, etc. The invention provides a video playback apparatus that plays a videodisc having different video information and special purpose information tracks. A multi-line video information storage circuit, a special purpose information storage circuit and a radial tracking mirror are controlled by a timing circuit in such a manner that the special purpose information track is sampled for a predetermined period and stored video information is displayed such that continuous video information and special purpose information recorded on the videodisc is presented contemporaneously to a monitoring means.

It is to be understood that the term special purpose information employed throughout the specification includes audio signals, data signals, etc.

BRIEF DESCRIPTION OF THE DRAWING

FIG. 2 is a block diagram of the invention showing the basic components of a video playback apparatus for use with a videodisc having special purpose information and a video information track;

FIG. 3 shows the still frame timing sequence; and

DESCRIPTION OF THE PREFERRED EMBODIMENTS

Figure 1:
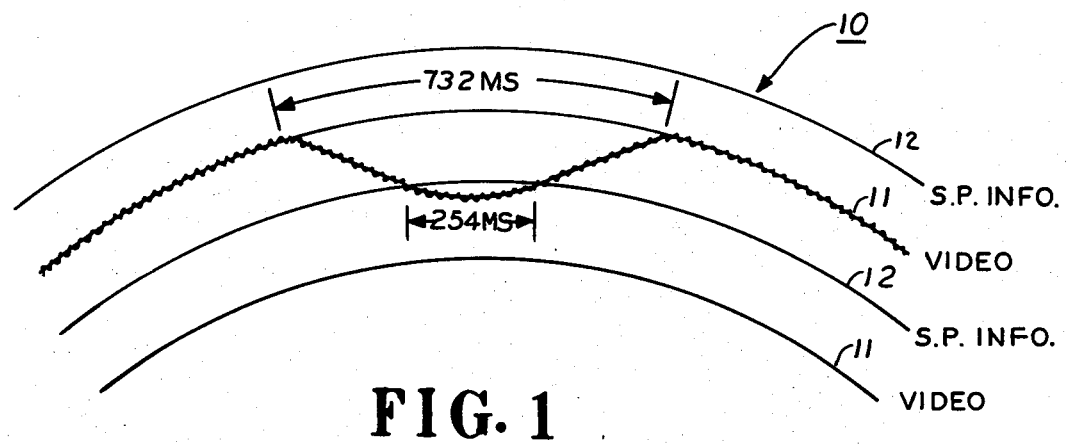
FIG. 1 is an enlarged partial view of the videodisc showing the separate video information and special purpose information tracks.

Referring to FIG. 1, a partially enlarged view of the videodisc of the invention is shown. Videodisc 10 is designed to have alternating special purpose information tracks 12 containing audio and other data signals and video tracks 11 containing video signals. A set of special purpose information tracks may be dedicated to each video information tracks. In appearance videodisc 10 looks like a conventional audio disc. However, the video and audio data is recorded in tracks of the video disc by a laser beam in the manner discussed above. Videodisc 10 is spun rapidly on the player of apparatus 20 of FIG. 4 and during its rotation the information contained on the special purpose information and video tracks are sampled by a pick-off or tracking mirror for predetermined periods in order to provide continuous video and special purpose information on the T.V. monitor. The manner in which the player switches or jumps between the video and special information tracks on the disc is discussed below in detail with regard to FIGS. 1 and 4.

Referring to FIG. 2, videodisc player 20 plays back video and special purpose information from videodisc 10. This video information is demodulated by demodulator 21 and is simultaneously fed to the 10 MHZ eight bit analog to digital converter 22, and to sync separator 23. In the analog to digital converter 22, the video information is sampled at a 10 MHZ rate and converted into 8 bit digital bytes. Depending upon control signals from the control and timing circuit 33, these bytes may be passed (1) to the output digital to analog converter 30 by way of multiplexer 28; (2) passed to the output digital to analog converter and at the same time stored in the video store 26 or, (3) omitted by the video chain while bytes are fed to the digital to analog converter from the video store.

In the audio channel there are two audio stores or memories 24 and 25 which are used to store the audio information received from the videodisc player 20. The audio circuits are designed to use delta modulations to code the input audio signals so that the information is stored in stores 24 and 25 in one bit bytes. Audio is first written in one of the stores 24 or 25 at a 10 MHZ rate. As soon as the storage is completed, the process of reading out the information begins. Expansion of the audio is achieved by reading the information at a 64 KHZ rate, which gives an expansion of about 150. Before the reading operation is completed from the first audio store, the second audio store is loaded from the signals from the videodisc. Reading is then started from the second memory. The audio information from stores 24 and 25 is multiplexed in multiplexer 27 and fed to delta demodulator 29 where it is converted into analog form.

The sync separator 23 removes the audio and video from the signals derived from videodisc player 20 and applies sync signals to timing and control circuits 33. The 10 MHZ crystal oscillator 32 supplies the memory timing and address advance signals to timing and control circuits 33. Control timing is derived from the video horizontal and vertical synch pulses contained in the output signals from the videodisc player. The control and timing circuits 33 direct the functions of all the circuits of the system. The control and timing circuit is mechanically linked (shown by the broken line) to the video disc player to switch the pick-off and radial tracking mirror (shown in FIG. 4) from the video track to the special purpose track during predetermined time sequences.

The present design yields about 5 seconds of still frame video, with audio, for each pair of tracks. The duration of audio per track pair may be increased at the expense of audio band width or signal to noise ratio. Although this design has utilized digital storage for both audio and video signals, analog storage may be used for either or both of these.

During still frame operation of the videodisc, audio output is suspended. This is done because the audio signal associated with one normal frame is only of 1/30th second in duration and this small section of audio signal would be repeated at a 30 Hz rate. In many applications it would be desirable to have audio or special purpose signals available during still frame operation. This may be done by recording video information and special purpose information on alternate tracks. Since the videodisc player cannot read two tracks simultaneously, some technique is needed to allow continuous display of the video information frame while accessing the special purpose information. The present invention provides such a technique.

In the general case, the video stored information must be at least enough to cover the period of time for the jump to the audio track. The quantity of special purpose or audio information stored must be at least enough to last the full period from video store to video store. The assumptions made for the following design are that the jump time from video track to audio track and from audio track back to video track are each 4 horizontal line times or $4 \times 63.5 = 254$ micro-seconds. Also that the audio information is compressed on the disc by a factor of about 150, and that the 254 microseconds is allotted for storing audio information. This means that the period from video store to video store may be as long as $254 \times 150 = 38,100$ microseconds or 1.14 frame times.

FIG. 3 shows the timing sequence. Horizontal distances are time, measured in horizontal line times indicated along the top line. The reference for the time is the A frame vertical sync pulse shown on the second line. The third line shows the beginning of the still frame sequence. Video information is stored for the first 12 H. At the same time, and throughout the full first frame, video information is being displayed from the disc. During the first 12 H of Frame 2, a jump is made to the audio track, compressed audio information is stored for 4 H, and a jump is made back to the video track. During these 12 H of Frame 2, video information is supplied to the display from storage. This is the information which was stored in Frame 1. During the rest of Frame 2, video information is supplied by the disc. Audio information is obtained by expanding the stored audio signal. After the jump back to the video track is completed, another 4 H lines of video are stored. This video replaces the video which previously covered the jump to audio (line 1-4). The video store now covers lines 5-16. Frame 3 repeats the above sequence with all of the times delayed by 4 H. With each new frame, 4 new lines of audio are read off of the audio track, and the video store is updated 4 lines from the video track. In this example, audio information would be supplied for 131 frames, each frame supplying 4 H of compressed audio information. With a compression ratio of 150, this would give about 5 seconds of normal audio. If more audio is desired, additional pairs of tracks may be added adjacent to the first pair. The timing sequence for additional pairs will be the same as for the original pair except that audio will be available during the first frame having been supplied by the last frame of the previous pair of tracks. This allows extending the audio without an interruption.

Figure 4:
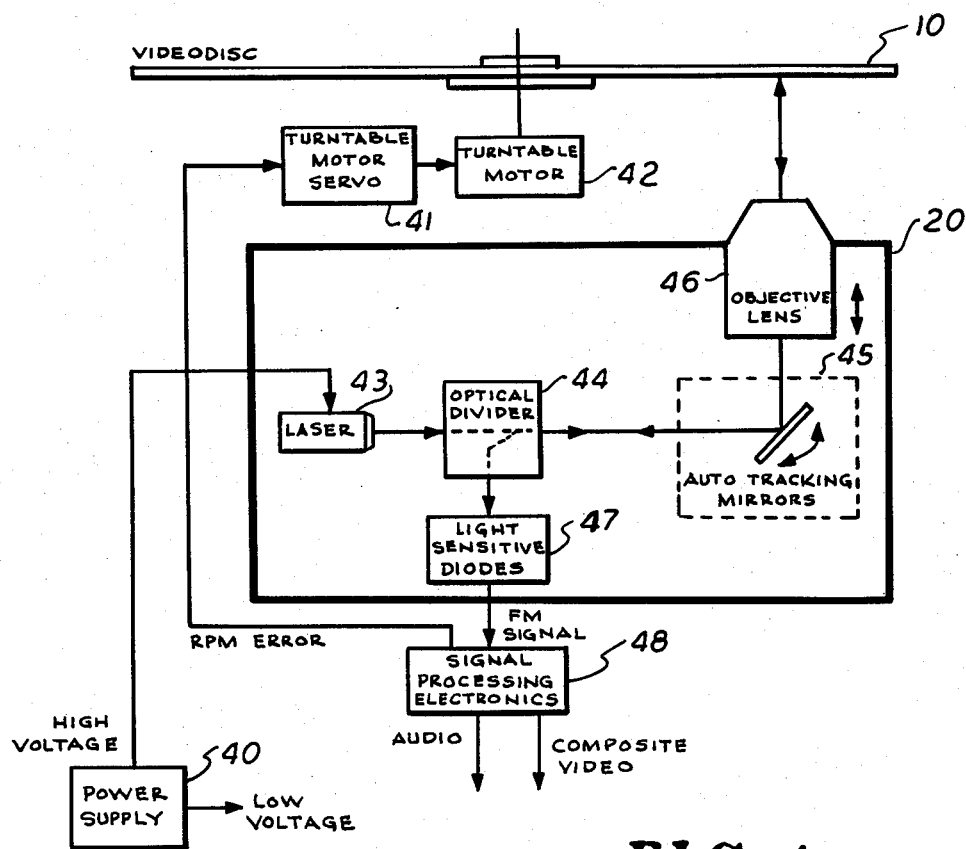
FIG. 4 shows a simplified diagram of the laser beam control assembly.

Referring to FIG. 4, there is shown a simplified diagram laser beam control assembly. The laser 43 generates a red light beam which is then deflected by automatic tracking mirrors 45 up into the objective lens or pick-off 46. Lens 46 focuses the beam into a tiny point on the bottom of videodisc 10. Tracking mirrors 45 are under the control of timing and control circuit 33 (FIG. 4) as stated above. Thus, at predetermined periods tracking mirrors 45 are rotated causing the beam from lens 46 to jump from the video information track to the special purpose information track and then return to the video information track for storage of video and special purpose information. The reflected beam follows the identical path through the objective lens 46 and the automatic tracking mirrors 45 to the optical divider 44. The reflected beam is then separated from the original beam and sent to light sensitive diode or photodiode 47. Diodes 47 conduct a varying current dependent upon how much light falls on them. Since the reflected beam is intensity modulated by the pits on the videodiscs, diodes 47 create the FM signal which was recorded on the videodisc. The FM signal from diodes 47 is applied to signal processing electronics 48 which demodulates the FM signal to create the composite video signal and the audio signal. The composite video signals are applied to the demodulator 21 of FIG. 2 and the audio signals are applied to audio stores 24 and 25 also of FIG. 2.

The signal processor 48 also generates an RPM error voltage which is proportional to the errors in the turntable motor speed. The RPM error voltage is applied to turntable motor servo 41 which in turn controls the speed turntable motor 42.

The power supply 40 produces high DC voltage to start the laser. The low DC voltages are used to operate the other electronics in the system.

From the foregoing, a videodisc playback apparatus having means to provide to a monitoring means continuous video signal with accompanying special purpose information signals has been demonstrated. It is understood that changes and modifications may be made without departing from the scope of the invention which is incorporated in the claims hereinafter.

What is claimed is:

1. A videodisc player comprising:
   a playback apparatus,
   a disc having video information and special purpose information in alternate tracks of said disc, said disc being rotatable upon said playback apparatus to provide video information and special purpose information as outputs of said playback apparatus,
   an analog to digital converter for converting said video signals from said disc into digital signals,
   a video storage circuit responsive to said analog to digital converter for storing a number of lines of video during a predetermined period of the rotation of said disc,
   a video multiplexer for multiplexing said input video with said stored video,
   an output video digital to analog converter for converting the output signals of said multiplexer to analog signals,
   a special purpose information storage circuit for storing a number of data of said special purpose information during a predetermined period shorter than said video storage period,
   a radial tracking mirror, and
   a control and timing circuit causing said radial tracking mirror at said predetermined periods to jump between said video information track and said special purpose information track in order to provide continuous video and special purpose information signals.

2. The videodisc player of claim 1 comprising:
   means for monitoring said video information and said special purpose information signals.

3. The videodisc player of claim 2 comprising:
   a first special purpose information storage circuit,
   a second special purpose information storage circuit, said control and timing circuit causing said second special purpose storage circuit to be loaded with signals from said videodisc before completing the reading of signals from said first special purpose information storage circuit,
   an audio multiplexing circuit for multiplexing the output signals of said first and second special purpose storage circuits, and
   a delta demodulator for converting the output signals of said multiplexer to analog form.

4. A videodisc player comprising:
   a playback apparatus,
   a disc having video information and special purpose information in different tracks of said disc, said disc being rotatable upon said playback apparatus to provide video information and special purpose information as outputs of said playback apparatus,
   means for accessing said special purpose information track for a predetermined period during each rotation of said disc so that continuous video information is provided as well as information from said special purpose track,
   means for storing said video and special purpose information so as to permit uninterrupted video display,
   means for controlling and timing the storage of said video information and the storage of said special purpose information, and
   a pick-up means for detecting the signals in said tracks of said videodisc and wherein said control and timing means causes said pick-up means to jump from said video track to said special purpose information track for a predetermined period during the rotation of said disc and then return to said video track, said information in said video track being stored in said video store during a first frame at the same time said video information is being displayed and during a second frame said pick up means is caused to jump to said special purpose information track and said special purpose information is stored in said special purpose information store after which said pick-up is caused to return to said video track during which time updated video information is stored replacing video information previously displayed during the jump from said video track to said special purpose information track, the sequence of jumping said pick-up means from said video track to said special purpose track continuing so that with each new frame new data of special purpose information are read off and the video store is updated from said video track.

5. The videodisc player of claim 4 comprising:
   means for monitoring said video information and said special purpose information and wherein said disc comprises a plurality of said special purpose information tracks, a set of which is dedicated to each of said video information tracks.

* * * * *